United States Patent Office 2,862,897
Patented Dec. 2, 1958

2,862,897

ADHESIVE COMPOSITION COMPRISING PHENOL ALDEHYDE RESIN AND HYDROXYALKYLCELLULOSE AND METHOD OF PREPARING SAME

Eugene M. Barrentine, Theodore S. Hodgins, and Frederic J. Shelton, Seattle, Wash., assignors to Reichhold Chemicals, Inc., Detroit, Mich.

No Drawing. Application September 16, 1954
Serial No. 456,606

11 Claims. (Cl. 260—14)

This invention relates to an improvement in aqueous thermosetting phenol formaldehyde resins suitable as an adhesive for the manufacture of plywood. In particular this invention relates to the production of aqueous solutions of phenol formaldehyde resinous products which may be combined with various finely divided natural fibrous extenders which may, if desired, be semi-pulped with alkaline pulping agents, to give thermosetting adhesives suitable for laminating or plywood manufacture. Such resins are improvements over existing resins in the art in possessing greater storage life and being more water soluble and providing increased flow when subjected to heat and pressure in a hot press during a laminating cycle.

In the art of making phenol-formaldehyde resins for use as plywood adhesives the use of multiple additions of alkali has been well developed. Adhesives made from such multiple addition of catalyst resins combined with cellulose type extenders have shown greatly limited tolerance to assembly time. Typical resins made with multiple addition of caustic soda catalyst are described in Reissue Patent No. 23,347. When resins of this type, such as are disclosed in Example 2 of Reissue Patent No. 23,347, are combined with cellulosic filler or finely ground Douglas fir bark which has been semi-digested with caustic soda the practical maximum commercial limit to the time between spreading such an adhesive mix onto veneers and placing the resulting plywood assembly in a hot press for consolidation under heat and pressure is about 15 to 20 minutes. With the adhesive of our invention this time of assembly may be conveniently extended even up to 96 hours and still obtain excellent bonds on plywood.

The use of methyl cellulose as a thickening agent in alkaline phenol formaldehyde resin adhesives is described in U. S. Patent No. 2,462,253. The resins of our invention are an improvement over the resins of U. S. Patent No. 2,462,253 in being more water soluble, possessing greater storage life, requiring less hydrophillic colloid per unit of resin, with resulting economies and having greater flow when subjected to heat and pressure.

The preferred hydrophillic colloidal agent which we employ in the manufacture of our adhesive resin is an alkylene oxide derivative of cellulose such as hydroxyethylcellulose, hydroxypropylcellulose or other hydroxyalkyl cellulose. A suitable product, hydroxyethylcellulose for use in our resin may be made by the reaction of ethylene oxide and alkali cellulose in conventional manner as in U. S. Patent No. 2,135,128. We have found that not all reaction products of alkylene oxide and cellulose are entirely suitable for use in our process, those which have a ratio of combined moles of alkylene oxide to 1 mole of anhydro-glucose residue in the cellulose of between 0.3 and 1.6 being preferred. Products having a degree of substitution below 0.3 do not have a sufficiently high degree of solubility in dilute sodium hydroxide solution to be entirely suitable, and in some instances the resulting resins have suspended insoluble particles of hydroxyalkylcellulose. Products having a degree of substitution greater than 1.6 moles of alkylene oxide per mole of anhydro-glucose residue in the cellulose are too water soluble, tending to reduce the water insolubility and permanence of the resulting resin when thermoset. Products having such a high amount of combined ethylene oxide are also expensive due to the high cost of ethylene oxide compared to cellulose.

Examples of commercially available hydroxyethylcellulose which are suitable for use in practicing our invention are: "Natrosol," the trade name of hydroxyethylcellulose produced by Hercules Powder Company, Wilmington, Delaware. "Cellosize" (viscosity grades 25–30000 cps.) the trade name of hydroxyethylcellulose made by Carbide & Carbon Chemicals Co., of New York City. "Ceglin" (regular grades), the trade name of hydroxyethylcellulose made by American Viscose Co., Philadelphia, Pennsylvania.

In general we prefer a hydroxyalkylcellulose which has a viscosity when measured at a 5% concentration in 7% sodium hydroxide solution of between 50 cps. and 3000 cps. at 25° C.

We have discovered in using hydroxyalkylcellulose that only a small quantity is needed. For instance, we use between 0.05 and 0.33 part of hydroxyethylcellulose per 100 parts of 50% non-volatile content phenolic resin. The preferred amount is 0.2 part of hydroxyethylcellulose per 100 parts of 50% non-volatile content phenolic resin.

While hydroxyethylcellulose is useful in a wide variety of resins for a number of different technical applications, we have found that phenol-formaldehyde resins having a ratio of moles of formaldehyde per mole of phenol varying from 1.6 to 2.2 give superior performance as hot press plywood adhesives. The amount of sodium hydroxide which is present may vary between the limits of 0.1 and 0.7 mole of a sodium hydroxide per mole of phenol. An important feature of our invention is that the spreading characteristics of our adhesives are greatly improved over conventional multiple step caustic catalyst addition resins as described in Reissue Patent No. 23,347. Laboratory tests have shown that the resins of Reissue Patent No. 23,347 have an assembly time tolerance of about 20 minutes as a maximum with alkali swollen extenders whereas resin adhesives made according to our procedure will allow 40 minutes of assembly time when tested at 50 pounds per thousand square feet of double glue line of wet glue spread on 1/8" Douglas fir veneer core.

Resin containing 1.87 moles of formaldehyde per mole of phenol and 0.141 mole of sodium hydroxide and made with 0.22% of hydroxyethylcellulose per 100 parts of 50% nonvolatile content phenolic resin and reacted until a removed and cooled sample has a viscosity of 1000 cps. when measured at 25° C. has a water tolerance between 300% and 500%. This is contrasted with resin of identical composition except that 0.7 part of methylcellulose was substituted for the hydroxyethylcellulose. Reacted until a removed and cooled sample has a viscosity of 1000 cps. when measured at 25° C. the water tolerance of the latter resin was 25% to 35%. This striking difference in water tolerance indicates the high degree of solvation of our resin solution with water without the formation of sticky insoluble precipitated masses which occur with methylcellulose thickened resins, for instance in washing up glue mixing equipment and washing resin off the operator's hands. The ability of our resin to hold tightly to its water of solvation we believe is largely responsible for the extraordinary assembly time tolerance when used in the manufacture of plywood compared with comparable methylcellulose containing resin.

Resins thickened with an alkylene-oxide cellulose reaction product may be extended and modified in the preparation of an adhesive with various types of natural materials such as softwood bark flour, finely comminuted nut shell, wood, endocarps of drupes, residue from the manufacture of furfural from pentosan containing natural products and the like.

Such residues of furfural are commercially available under the name "Furafil," which is a trademark of the Quaker Oats Company, and is defined in Reinhold, The Condensed Chemical Dictionary, 5th edition, as follows:

"Furafil"—Trademark for lignocellulose produced by the pressure digestion of the acidified residue remaining after extraction of furfural from agricultural raw materials.

Properties: Dark brown free-flowing powder; burnt sugar odor, absorbs its own weight of water or oil; bulk density 30–35 lb./cu. ft.; pH (water extract) 2–3.

The water tolerance test used in the following examples was carried out as follows: 10 ml. of resin at 20° C. are placed in a 100 ml. graduate and successive increments of water at 20° C. are added from a burette with thorough agitation by hand shaking until a visible milky precipitate results. The ratio of ml. of water to ml. of resin multiplied by 100 is termed the water tolerance percentage.

The procedure used to determine the non-volatile content of the resinous products is as follows: A 2 gram sample is weighed from a pipette into a weighed steel pan $2^{15}/_{16}$ inches in diameter and ¾ inch deep. 10 ml. of anhydrous methanol are added from a pipette and mixed with the 2 grams of resin by swirling. The pan and contents are placed in an oven for 16 hours at 105° C. Upon removal from the oven the pan and contents are placed in a dessicator (anhydrous $CaCl_2$ desiccant) and weighed when cooled to room temperature. Loss in weight of the sample divided by the sample weight and multiplied by 100 is the percent volatile material. 100 minus the percent volatile is the non-volatile content of the resin.

In the following examples the lowest water tolerance obtained was 400%. Under slightly different reaction conditions using the lowest amount of sodium hydroxide and the lowest amount of hydroxyalkycellulose, resins have been made with the lowest water tolerance, approximately 100%.

Satisfactory resins have been produced having resin viscosities when measured at 50% non-volatile content and 25° C. by a Brookfield viscosimeter of between 150 to 100,000 cps. by varying the concentration and reaction conditions.

In the manufacture of resins according to our procedure potassium hydroxide and other alkali metal hydroxides may be considered equivalent to sodium hydroxide. The initial concentration of alkali may vary between 0.1 and 0.65 mole per mole of phenol. The total alkali may vary between 0.13 and 0.70 mole per mole of phenol.

*Example I*

The following is an example of the use of hydroxyethylcellulose in the highest desirable concentration in a resin having a formaldehyde to phenol mole ratio of 1.8:1.

In preparing this resin the ingredients were reacted in a conventional 5 liter glass reaction flask equipped with a mechanical stirrer, reflux condenser, cooling and heating means, and thermometer.

To the flask with continuous agitation were added in the following order a premix consisting of 162.0 grams of water, 18.0 grams of sodium hydroxide and 13.2 grams of hydroxyethylcellulose (Natrosol, obtained from the Hercules Powder Company, Wilmington, Delaware). This product had a viscosity of 3000 cps. when measured at 5% concentration in 7% NaOH solution at 25° C. with a Brookfield viscosimeter. The premix was thoroughly stirred and allowed to stand one hour before adding to the resin reaction flask. 2,235 grams of 37% formaldehyde solution (methanol content below 1% and formic acid content below 0.02%) were added to the flask. 1,472 grams of U. S. P. phenol were added to the flask. 94 grams of 49.6% sodium hydroxide solution were added to the mixture, thoroughly stirred and the temperature was raised from 30° C. to 45° C. in 45 minutes. Heating was continued from 45° to 80° C. in 45 minutes. The temperature was held at 80° C. until a viscosity of a removed and cooled sample measured at 25° C. was between W and X on the Gardner-Holdt scale. The time required to reach this viscosity will vary between batches but will generally be in the order of 3 hours. Cooling was then applied for 15 minutes until a temperature of 60° C. was reached. At this point 43.3 grams of 49.6% sodium hydroxide were added with thorough stirring to the reaction mass and cooling was continued until a temperature of 20° C. was reached, which required about an hour.

The resulting product was a reddish brown solution which is translucent in a 2 inch section, but which is slightly turbid in thicker sections. The viscosity of the reaction product was 1012 cps. when measured at 25° C. with the Brookfield viscosimeter. The non-volatile content of the resin was 50.5%. The specific gravity was 1.1761 at 25/25° C. The water tolerance was 450%. The presence of a number of small particles of undissolved hydroxyethylcellulose was noted. Subsequent batches reacted initially at 90° C. showed complete absence of these particles. The presence of these small particles in no way interfered with the action of the adhesive mix. The plywood adhesive mix was made as follows:

170 grams of water at 100° C. were placed in a 5 quart dough mixer (Hobart dough mixer, Model C–10) equipped with a steam jacket. 25 grams of technical grade soda ash (58% $Na_2O$) were dissolved in the hot water by mixing for 5 minutes. 70 grams of 49.6% technical grade caustic soda solution were added and mixed for 1 minute. To the alkaline water solution 100 grams of Douglas fir bark flour (Silvacon WT–472 obtained from the Weyerhaeuser Timber Co., Longview, Washington), were added and mixed 25 minutes holding the temperature at 82–100° C. At the conclusion of this mixing period cooling was applied and the temperature of the bark mix was reduced to below 60° C. and 500 grams of the resinous reaction product of Example I were added with thorough stirring together with 5 grams of pine oil. The resulting product was a glossy black viscous thixotropic colloidal mass containing numerous small jelly like particles of swollen bark. The viscosity of this adhesive was 14,000 cps. as measured on a Brookfield viscosimeter at 10 R. P. M. with a No. 3 spindle at 25° C.

Plywood was made from the adhesive by spreading $3/_{16}"$ Douglas fir veneer (moisture content 4%) with 55 pounds of adhesive per thousand square feet of double glue line, placing between two cross plies of ⅛" Douglas fir veneer (moisture content 4%) and hot pressing for 9½ minutes with 2 panels per opening at a platen temperature of 285° F. and a pressure of 200 pounds per square inch with varying closed assembly periods from 5 to 40 minutes with the following results:

| Closed assembly time (no open assembly time), minutes | CS 45-48 2 cycle boil test results, percent wood failure |
|---|---|
| 5 | 90 |
| 20 | 100 |
| 30 | 95 |
| 40 | 97 |

These results indicate that there is substantially no difference in the quality of the plywood bond produced over the wide range of closed assembly times studied, which is an important characteristic of our adhesive as contrasted to the methyl cellulose or polyvinyl alcohol containing adhesives of U. S. Patent No. 2,462,253 and U. S. Patent No. 2,462,252. The latter type adhesives show a limited tolerance to closed assembly times which limits their commercial application to a maximum of 30 minutes closed assembly time when tested by the same CS 45-48 test and approved by the Douglas Fir Plywood Association. Improved resins produced by our process are in commercial use and approved by the Douglas Fir Plywood Association for closed assembly periods of up to 40 minutes.

*Example II*

The following is an example of the use of hydroxyethylcellulose in the highest desirable concentration in a resin having a formaldehyde to phenol mole ratio of 1.9:1:

In preparing this resin the ingredients were reacted in a conventional 5 liter glass reaction flask equipped with a mechanical stirrer, reflux condenser, cooling and heating means, and thermometer.

To the flask were added in the following order a premix of 141.5 grams of water, 11.5 grams of sodium hydroxide and 12.3 grams of hydroxyethylcellulose (Natrosol, obtained from the Hercules Powder Company, Wilmington, Delaware. This product had a viscosity of 3000 cps. when measured at a 5% concentration in a 7% sodium hydroxide solution, with a Brookfield viscosimeter at 25° C.). The premix was thoroughly stirred and allowed to stand 16 hours before adding to the resin reaction flask. 2134 grams of 37% formaldehyde solution (methanol content below 1% and formic acid less than 0.02%) and 1296 grams of U. S. P. phenol were added. 95 grams of 49.6% sodium hydroxide solution were added. After thoroughly mixing these ingredients the temperature was found to be 30° C. Heat was then applied and the temperature of the reaction mass was increased to 45° C. in 45 minutes. Heating was continued at a different rate to bring the temperature of the reaction mass from 45° to 80° C. in 45 minutes. Heating was continued to bring the temperature from 80° to 90° C. in 10 minutes. The temperature was then held at 90° C. for 20 minutes during which time the hydroxyethylcellulose became completely dissolved. After the solution of the hydroxyethylcellulose the reaction mass was cooled in 15 minutes to 80° C. and this temperature was maintained until the viscosity of a removed sample cooled and measured at 25° C. was between R and S on the Gardner-Holdt scale. Cooling was immediately applied and the temperature reduced to 75° C. and maintained at 75° C. until the viscosity of a removed sample cooled and measured at 25° C. was between W and X on the Gardner-Holdt scale. Cooling was applied and the temperature reduced to 60° C. in 10 minutes. At this point 39 grams of 49.6% sodium hydroxide solution were added with continued rapid cooling until a temperature below 20° C. was reached. The resulting product was a reddish brown solution having a viscosity of 1070 cps. at 25° C. as measured on a Brookfield viscosimeter. The non-volatile content of the resin was 51.5%. The specific gravity was 1.1745 at 25/25° C. The water tolerance was 400%.

A plywood adhesive was made according to the procedure used in Example I with 40 minutes closed assembly time and results obtained on the standard plywood test on Example I were 88% wood failure. Samples of this plywood exposed on a test weathering fence have shown no failure after 16 months of weathering.

*Example III*

The following is an example of the use of hydroxyethylcellulose in low percentage in a resin having a formaldehyde to phenol mole ratio of 2.08:1. This resin was prepared in the equipment of Example I.

To the flask with continuous agitation were added in the following order a premix consisting of 162.5 grams water, 12.5 grams of sodium hydroxide and 2.0 grams of hydroxyethylcellulose (Natrosol of Example I). The premix was thoroughly stirred and allowed to stand 1 hour before adding to the flask. 1000 grams of U. S. P phenol were added to the flask. 1812 grams of 37% formaldehyde solution (methanol content less than 1% and formic acid less than 0.02%) were added with thorough stirring. 350 grams of 49.6% technical sodium hydroxide solution were added slowly keeping the temperature below 40° C. Heat was then applied and the reaction mass was heated to 60° C. in 17 minutes and held at this temperature for ½ hour. Additional heat was applied raising the temperature to 85° C. within 45 minutes and the reaction mass was held at this temperature until a removed sample cooled to 25° C. had a viscosity of J to L on the Gardner-Holdt scale. At this time the batch was cooled to 80° C. and held at this temperature until the viscosity of a removed sample cooled to 25° C. was T to U on the Gardner-Holdt scale. At this point the batch was further cooled to 60° C. and 25 grams of 49.6% sodium hydroxide solution were added and the batch cooled rapidly to 20° C. in about 1 hour.

The resulting product was a reddish brown clear solution having a viscosity of 588 cps. (Brookfield viscosimeter at 25° C.) and having an infinite water tolerance. The non-volatile content was 48.5%. The specific gravity of the resin was 1.2052 at 25/25° C. There were no particles of undissolved hydroxyethylcellulose.

An adhesive was made using this resin in exactly the same way as in Example I and was tested as a plywood adhesive in the same way as in Example I with the exception that a glue spread of 59 pounds per thousand square feet of double glue line was used on ¾6 inch veneer in a 13⁄16 inch 5 ply plywood construction and pressed for 8½ minutes single panel per opening and gave the following results:

| Closed assembly time (no open assembly time), minutes | CS 45-48 boil test results, percent wood failure |
|---|---|
| 10 | 92 |
| 20 | 95 |
| 30 | 94 |

The resin of this example was also tested for use with an extender consisting of the finely ground residue from the manufacture of furfural from corn cobs (trademark Furafil 100-S, made by the Quaker Oats Co., of Chicago, Illinois). The adhesive mix was made as follows:

In the same mixer as was used in Example I, 290 grams of water at 70° F. were added to the glue mixer. 100 grams of Furafil 100-S and 30 grams of technical grade soda ash (58% $Na_2O$) and 60 grams of 49.6% sodium hydroxide solution were added and allowed to mix for 15 minutes. During this time the temperature rose to about 75° C. At the end of this time cooling was applied and 725 grams of the resin of Example III were added with thorough stirring and the entire mix cooled to 25° C. in approximately 20 minutes. This mixture was a glossy black thixotropic colloidal mass in which the greatly swollen Furafil particles gave it a characteristic fine grainy appearance. This mixture was used in the manufacture of plywood as noted previously in the example with the following results:

| Closed assembly time (no open assembly time), minutes | CS 45–48 boil test results, percent wood failure |
|---|---|
| 10 | 90 |
| 20 | 99 |
| 30 | 96 |

These results were surprising since there is no difference between adhesive made with fir bark flour and with Furafil extender as contrasted to resins either containing methocel or polyvinyl alcohol as thickeners. Results obtained under similar test conditions with Furafil extender using the latter resins are of the order of 60% wood failure in the CS 45–48 boil test.

*Example IV*

The following is an example of the use of hydroxyethylcellulose in medium concentration in a resin having a formaldehyde to phenol mole ratio of 1.8:1. The resin was prepared in the equipment of Example I.

To the flask with continuous agitation were added in the following order a premix consisting of 151 grams of water, 25.2 grams of 49.6% sodium hydroxide solution and 10.6 grams of hydroxyethylcellulose (Natrosol of Example I). The premix was thoroughly stirred and allowed to stand 24 hours before being added to the flask. 1,510 grams of U. S. P. phenol were added to the flask. 2,345 grams of 37% formaldehyde solution (methanol content less than 1% and formic acid content less than 0.02%) were added with thorough stirring. 114 grams of 49.6% technical grade sodium hydroxide solution were added and heat was then applied to bring the temperature of the materials in the flask to 45° C. in 45 minutes. Heating was continued and the temperature was raised from 45° to 80° C. in 45 minutes. It was noted that the hydroxyethylcellulose was not all dissolved at this point. The temperature was then raised from 80° to 90° C. in 10 minutes and held at 90° C. for 20 minutes. It was noted that all the hydroxyethylcellulose was dissolved. The temperature was then dropped to 80° C. in 10 minutes by cooling and held there for 3 hours and then lowered to 75° C. in 10 minutes of cooling and held at 75° C. until a removed sample cooled to 25° C. had a viscosity of W to X on the Gardner-Holdt scale. When this viscosity was obtained the temperature was lowered to 60° C. in about 10 minutes, at which point 45 grams of 49.6% technical grade sodium hydroxide solution was added and the reaction product cooled to 20° C. in about 1 hour.

The resulting product was a stable reddish brown solution having a viscosity of 1,100 cps. as measured on the the Brookfield Viscosimeter. In 30 days when stored at 23.4° C. the viscosity had advanced to 3,700 cps. Under the same storage conditions a resin containing methylcellulose at the same concentration and having the same starting viscosity had increased to 4,200 cps. in the same period. The non-volatile content was 50.5% and the specific gravity was 1.1750 at 25/25° C. The water tolerance was 400%. There were no particles of hydroxyethylcellulose visible.

An adhesive mix was made in the mixing equipment of Example I as follows: 180 grams of water at 100° C. were placed in the steam jacketed dough mixer. 30 grams of technical soda ash (58% Na$_2$O) were dissolved in the hot water by mixing 5 minutes. 85 grams of 49.6% technical grade caustic soda solution were added and mixed 1 minute. To this alkaline water solution 110 grams of Douglas fir bark flour (Silvacon WT-472) were added and mixed for 25 minutes holding the temperature between 88° and 100° C. for 20 of the 25 minutes. Cooling was then applied and the temperature of the mass lowered to 60° C., at which point 500 grams of resin from Example IV and 5 grams of pine oil were added and mixed well. Cooling was continued until a temperature of 20° C. was reached.

Plywood was made from this adhesive by spreading two cores of 1/10 inch Douglas fir veneer (moisture content 3%) with 56 pounds per thousand square feet of double glue line and placing together with two 1/10 fir faces and one 1/10 inch fir center core in a 5 ply plywood assembly and hot pressed at 285° F. and 200 pounds per square inch for 6½ minutes with varying closed assembly periods from two minutes to 96 hours with the following results:

| Closed assembly time (no open assembly time) | CS 45–48 boil test results, percent wood failure |
|---|---|
| *Minutes* | |
| 2 | 90 |
| 10 | 99 |
| *Hours* | |
| 24 | 98 |
| 96 | 95 |

The ability of resins of our invention to withstand exceptionally long periods of closed assembly time is remarkably demonstrated in this example. This is a noteworthy advance in the adhesive art and has greatly extended the use of this type of resin adhesive in the manufacture of Douglas fir plywood.

The invention has been described in detail for the purpose of illustration but it will be obvious that numerous modifications and variations may be resorted to without departing from the spirit of the invention.

We claim:

1. An adhesive composition suitable for plywood manufacture comprising predominantly a low molecular weight aqueous alkaline thermosetting phenol formaldehyde resin and a thickening agent composed of a relatively small proportion of a hydroxyalkylcellulose within the range of .05 to .33 part of hydroxyalkyl cellulose per 100 parts of 50% non-volatile content phenolic resin, added during the preparation of the resin, the condensation reaction being continued to a stage short of solidification of the mass when cooled to 25° C.

2. An adhesive composition as set forth in claim 1 wherein the hydroxyalkyl cellulose is hydroxyethyl cellulose having a water tolerance greater than 100%.

3. An adhesive composition as set forth in claim 1 adapted for plywood manufacture wherein the alkaline phenol formaldehyde resin has a ratio of mole of formaldehyde per mole of phenol varying from 1.6 to 2.2 and contains between 0.10 and 0.70 mole of an alkali metal hydroxide per mole of phenol.

4. An adhesive composition as set forth in claim 3 wherein the alkali metal hydroxide is sodium hydroxide.

5. An adhesive composition as set forth in claim 1 including a finely divided organic filler selected from a group consisting of softwood bark flour, finely comminuted nut shell, wood, endocarps of drupes, residue from the manufacture of furfural from pentosan containing natural products.

6. An adhesive composition as set forth in claim 5 wherein the filler is softwood bark flour.

7. An adhesive composition as set forth in claim 5 wherein the filler is a residue from the manufacture of furfural.

8. A method of producing an adhesive composition suitable for plywood manufacture which comprises heating and condensing to a dissolved water soluble thermosetting phenolic resinous product 1 mole of phenol with between 1.6 and 2.20 moles of formaldehyde in water in the presence of an alkali metal hydroxide catalyst and a thickening agent consisting of hydro-alkyl cellulose within the range of .05 and .33 part of hydroxyalkyl cellulose per 100 parts of 50% non-volatile content phenolic resin, and continuing the condensing reaction to a stage short of solidification of the mass when cooled to 25° C.

9. A process as set forth in claim 8 wherein an organic filler selected from a group consisting of softwood bark flour, finely comminuted nut shell, wood, endocarps of drupes, residue from the manufacture of furfural from pentosan containing natural products is mixed with the alkaline resin solution produced in accordance with claim 8.

10. A process as set forth in claim 8 wherein the alkali is sodium hydroxide within the range of 0.10 to 0.70 mole.

11. A process as set forth in claim 8 wherein the final alkaline resin solution has a viscosity of between 150 and 100,000 cps., when measured at a non-volatile content of 50% with a Brookfield viscosimeter at 25° C.

References Cited in the file of this patent

UNITED STATES PATENTS

| | | |
|---|---|---|
| 2,462,253 | Booty | Feb. 22, 1949 |
| 2,583,268 | Loklema et al. | Jan. 22, 1952 |
| 2,592,659 | Cone | Apr. 15, 1952 |
| 2,613,167 | Cone | Oct. 7, 1952 |